(12) United States Patent
Vander Laan et al.

(10) Patent No.: US 9,013,839 B1
(45) Date of Patent: Apr. 21, 2015

(54) VEHICLE HIGH VOLTAGE WIRING PROTECTION USING CONTACTOR CONTROL

(71) Applicant: Ford Global Technologies, LLC, Dearborn, MI (US)

(72) Inventors: Kevin Vander Laan, Bloomfield Hills, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/057,773

(22) Filed: Oct. 18, 2013

(51) Int. Cl.
*H02H 3/00* (2006.01)
*H02H 3/08* (2006.01)

(52) U.S. Cl.
CPC ...................................... *H02H 3/08* (2013.01)

(58) Field of Classification Search
USPC ................................. 361/23, 86–87
See application file for complete search history.

(56) References Cited

U.S. PATENT DOCUMENTS

| | | | |
|---|---|---|---|
| 6,249,126 B1 * | 6/2001 | Lin | ............................... 324/427 |
| 8,031,455 B2 | 10/2011 | Paik | |
| 2005/0285445 A1 * | 12/2005 | Wruck et al. | ................ 307/10.1 |
| 2008/0165461 A1 | 7/2008 | Paik | |
| 2012/0126785 A1 | 5/2012 | Paik | |

FOREIGN PATENT DOCUMENTS

| | | |
|---|---|---|
| JP | 2005019161 | 1/2005 |
| JP | 2006278003 | 10/2006 |
| JP | 2011016391 | 1/2011 |
| KR | 2005065185 | 6/2005 |

OTHER PUBLICATIONS

Author Unknown, Siprotec Numerical Protection Relays—Siemens Energy, Typical Protection Schemes, p. 2/24, 2006, http://pdf.directindustry.com/pdf/siemens-energy/siprotec-numerical-protection-relays-siemens/30064-19268-_33.html.

* cited by examiner

*Primary Examiner* — Danny Nguyen
(74) *Attorney, Agent, or Firm* — David B. Kelley; Brooks Kushman P.C.

(57) ABSTRACT

A vehicle high voltage system may include contactors/relays, wires, a traction battery, electrical components, and at least one controller. The at least one controller may open the contactors to interrupt current flow to the components if anyone of a plurality of amp■hour measurement associated with the traction battery exceeds a corresponding predetermined threshold value.

13 Claims, 5 Drawing Sheets

VEHICLE HIGH VOLTAGE WIRING PROTECTION USING CONTACTOR CONTROL

TECHNICAL FIELD

This disclosure relates to control of contactors/relays to protect a vehicle high voltage wiring and component infrastructure.

BACKGROUND

A hybrid-electric vehicle (HEV), all-electric vehicle (EV) or a fuel cell vehicle has a traction battery to store and provide energy for vehicle propulsion. The traction battery operates at an increased voltage, typically over 60 volts, in comparison to a traditional vehicle battery voltage of 12V. This increased voltage is used by an electric motor(s) to convert the electrical energy stored in the battery to mechanical energy in the form of a torque which is used to provide vehicle propulsion. The battery is connected to the electric motor via wires and electrical components. The battery may be charged by an electrical power grid when parked, by an on-board generator driven by an engine or by regenerative braking when in motion. This battery charging occurs when a current is provided by wires and electrical components to the battery, increasing the charge stored therein. The battery power capability indicates how much power the battery is capable of providing (discharge) or receiving (charge) in order to meet driver and vehicle demands.

SUMMARY

A vehicle high voltage system may include contactors/relays, wires, a traction battery, electrical components, and at least one controller. The at least one controller may be programmed to open the contactors to interrupt current flow to the components in response to an amp■hour measurement associated with a time period exceeding a corresponding predetermined threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
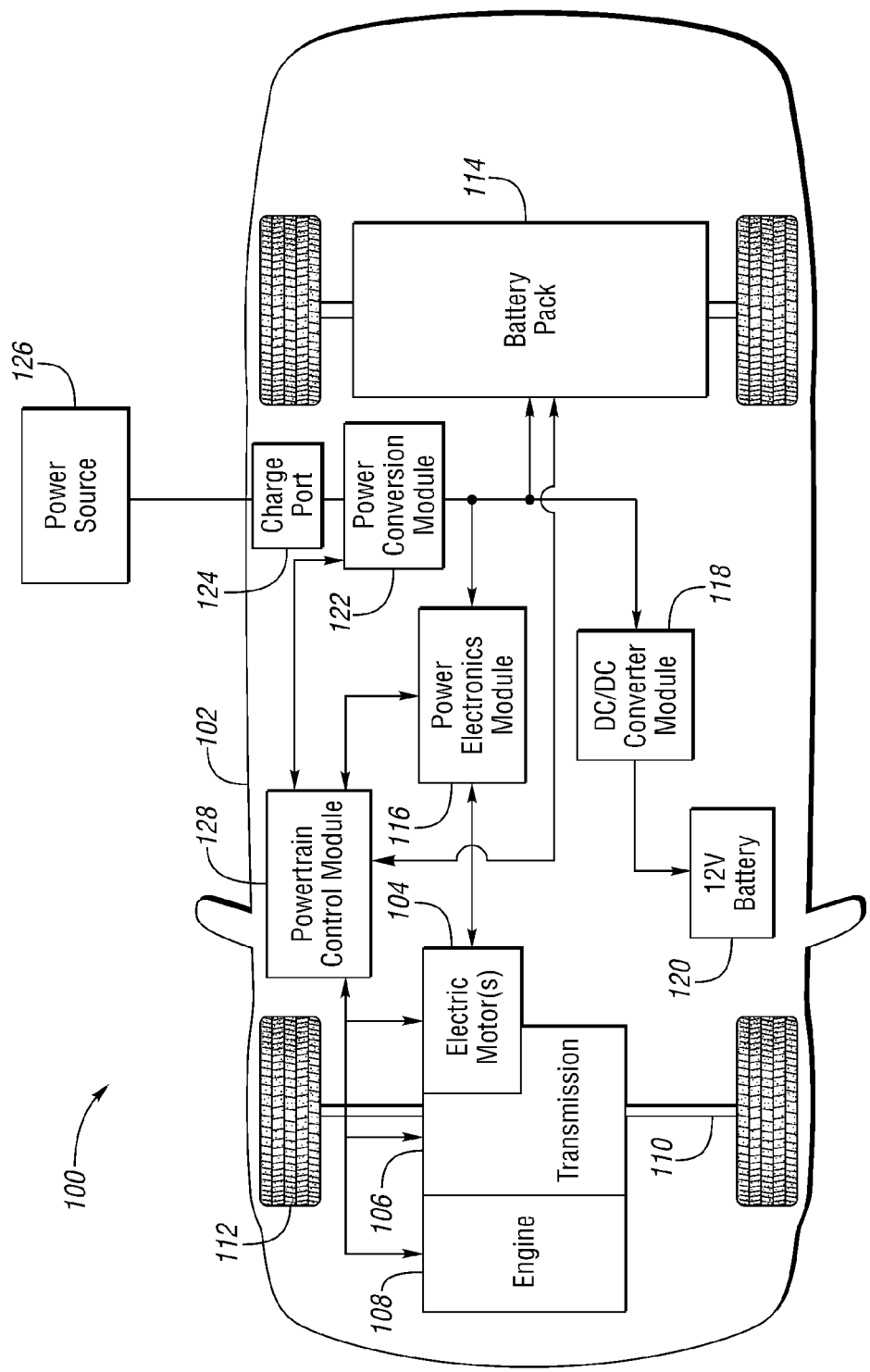
FIG. 1 illustrates an example hybrid-electric vehicle with a battery pack.

FIG. 1 depicts an example of a plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The fraction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

Figure 2:
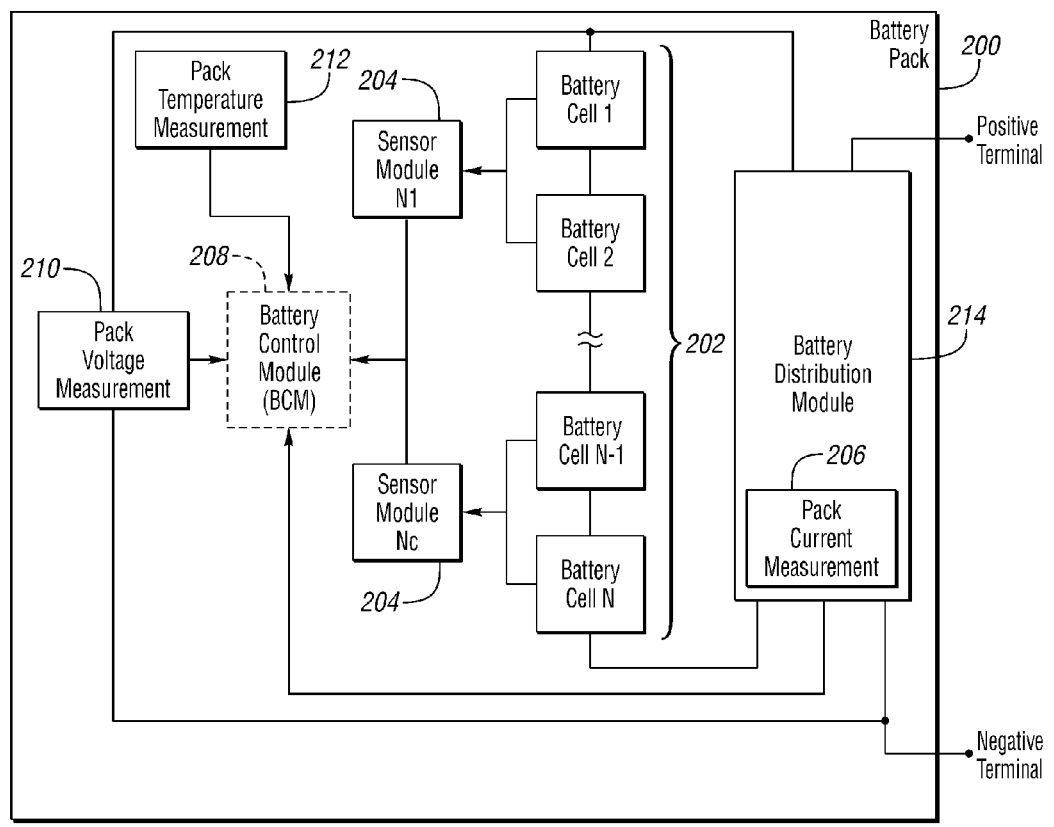
FIG. 2 illustrates a battery pack arrangement comprised of battery cells and battery cell monitoring and controlling systems.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, connectors, high voltage wires, circuit interrupt devices, The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the circuit may be opened via the use of a circuit interrupt device (CID) such as a fuse or circuit breaker.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200.

Figure 3:
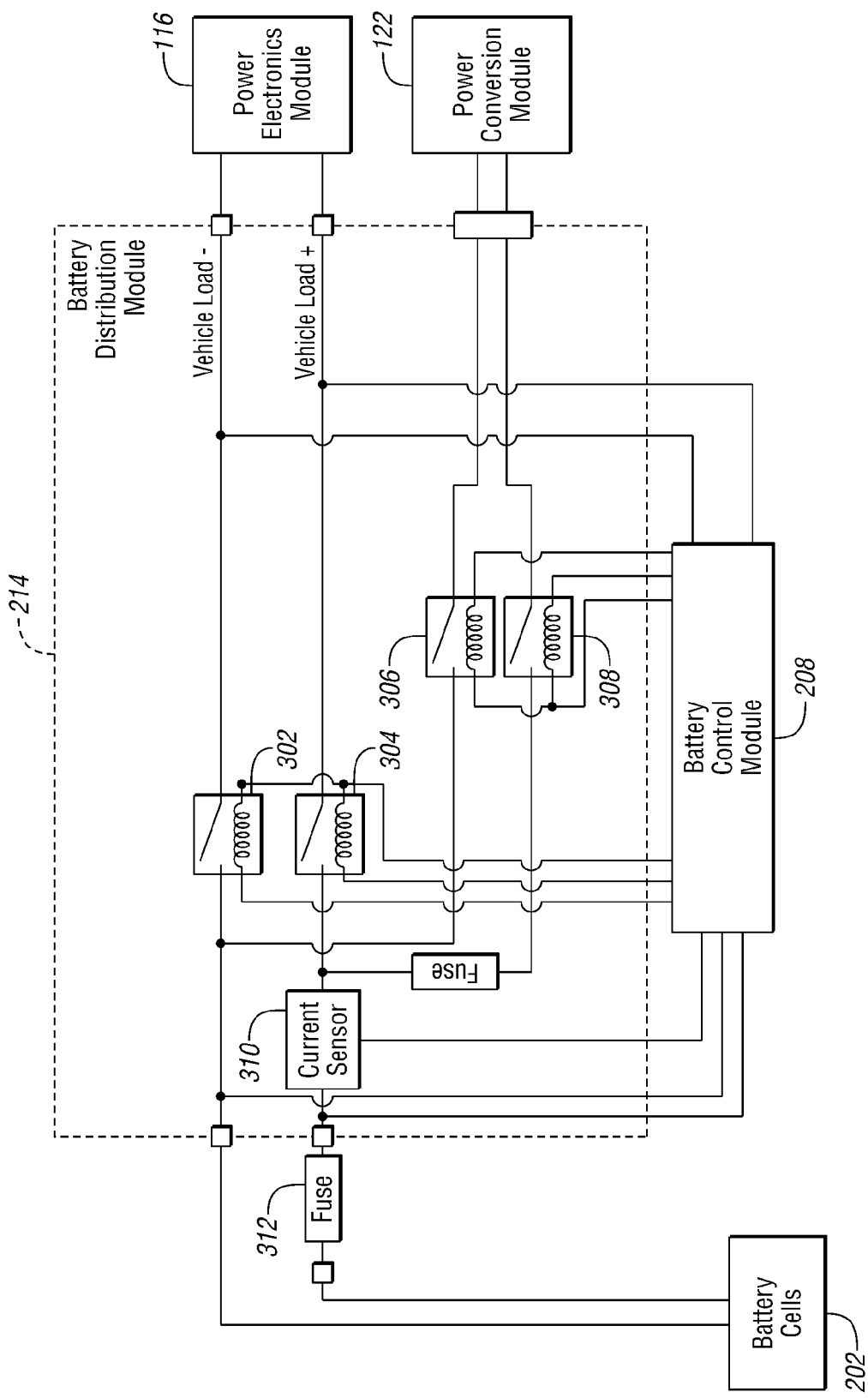
FIG. 3 illustrates a wiring diagram of an example hybrid electrical vehicle.

FIG. 3 is an illustration of a power electronics distribution module or a battery distribution module (BDM) 214. The BDM contains the high voltage switches (302, 304, 306 and 308) used to connect and disconnect the high voltage components. These high voltage switches (302, 304, 306 and 308) can be relays, IGBTs, MOSFETs, BJTs, or other electromechanical or solid state switches. The battery cells 202 provide the voltage and current which flows through switches 302 and 304 to the power electronics module 116. The current is measured in a current sensor block 310. The current also may also pass through a CID 312 which can include a fuse or circuit breaker, however the CID is not required as the system may be configured to protect the circuit over the complete range of operating amp■hour time periods. The BDM 214 also may include switches 306 and 308 which alternatively connect the battery cells 202 with the power conversion module 122.

Figure 4:
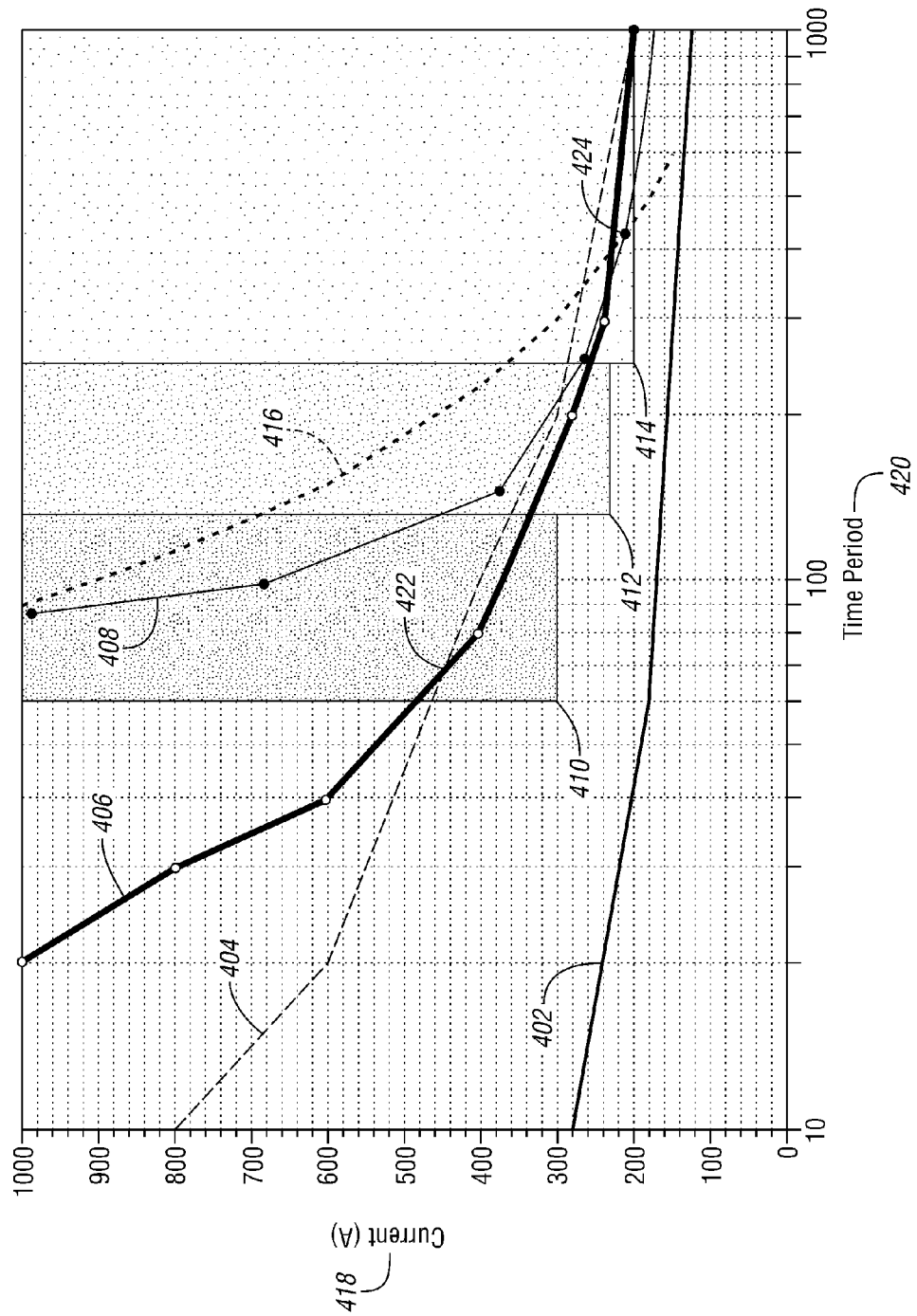
FIG. 4 is a graph that illustrates the maximum current in amperes with respect to time for components of a vehicle high voltage electrical system.

FIG. 4 is a graph of average or constant current 418 with respect to a period of time that the current is flowing 420. The average or constant current 418 flowing over a period of time maybe expressed in amp■hours. This can be quantified using a simple average, a root mean square, a weighted average such as a averaging using a finite impulse response (FIR) filter, etc. The typical or average vehicle load 402 is an average of a typical operating vehicle load. The CID disconnect line 404 is the value above which the CID will disconnect the current flowing from the battery cells to the BDM 214 or the power conversion module 122. Components in the system have electrical operating maximum above which they may no longer work properly. 406 is an example of the desired operating maximum for one component. A different component will likely have a different maximum operating point as illustrated in 408. The component with the characteristics of 406 is protected by the CID disconnect line 404 until point 422. A problem occurs when a component's maximum operating point (e.g. 406 and 408) drops lower than the CID disconnect point 404. The solution to this problem may include calculating a calibrateable threshold point 410 corresponding to a period of time. The threshold point 410 is an example of a predetermined threshold value that is determined taking into consideration the lowest maximum operating point of all components in the system (e.g. 406 and 408) and the vehicle load 402. A method of determining this point may include averaging the lowest maximum operating point (e.g. 406 and 408) and the vehicle load 402 for that time period, or may include an averaging weighted such that the threshold is ⅔ above the vehicle load 402. The threshold point 410 can be supplemented by other threshold points (e.g. 412 and 414) allowing the threshold points 410, 412, 414 to protect the system for a range of time periods. For example, the threshold point 410 protects the system for time periods between 60 seconds and 120 seconds, the threshold point 412 protects the system for time periods between 120 seconds and 240 seconds, etc.

416 is the battery capacity: a point at which the battery is not capable of providing greater currents for that period of time. The threshold point 414 is selected such that it protects the high voltage system components up to the point in which the battery capacity is exhausted. It is not necessary to protect components beyond the battery capacity 416 because the battery is exhausted. It may be desirable to determine the last threshold point 414 to protect for the intersection 424 of the lowest maximum operating point taking into consideration all components in the system (e.g., 406 and 408) and the battery capacity 416. Likewise, a threshold point may be calculated eliminating the need for a CID by determining the threshold for time periods less than the time period associated with the threshold point 410—provided that the determined threshold point is less than the minimum component ratings 406,408 and greater than the vehicle load 402. These time periods may require a current sensor capable of measuring larger currents.

Figure 5:
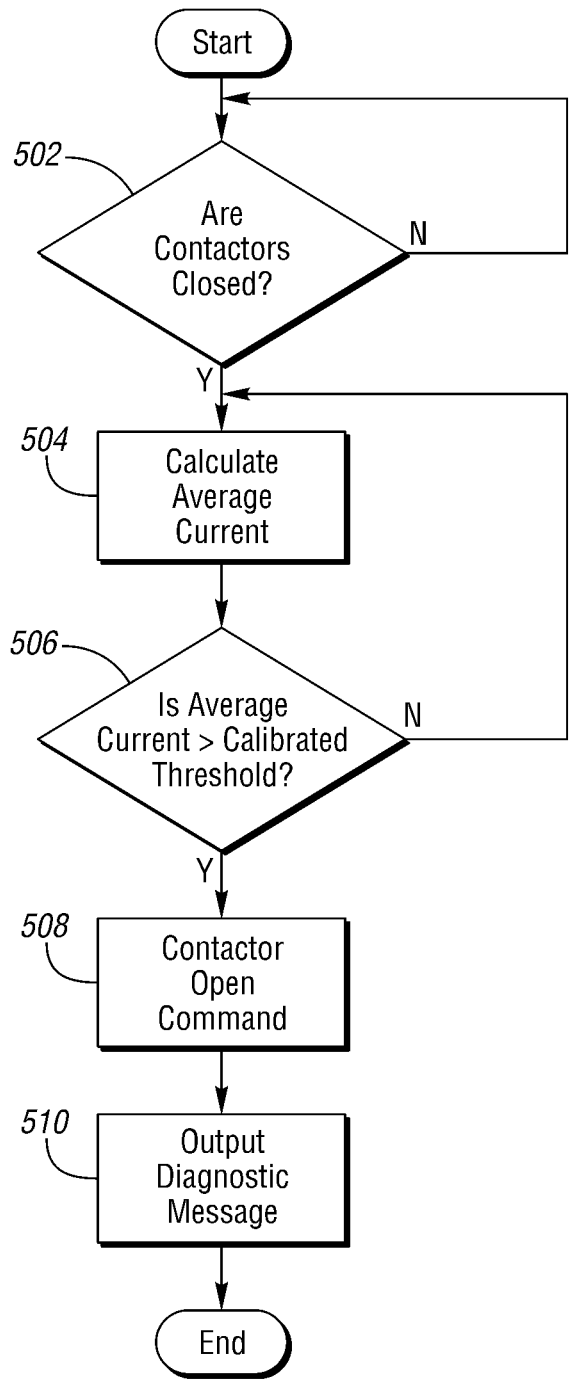
FIG. 5 illustrates a flow diagram of an algorithm used to protect a vehicle high voltage electrical system.

FIG. 5 is a flow diagram of a high voltage control system for a hybrid vehicle. The system checks to see if the contactors are closed in 502, if the contactors are not closed, the system waits until the contactors close. When the contactors are closed, the average current (amp■hours) is calculated in 504. This calculation may be the mathematical average, the root mean square (RMS), an integral of the current over a period of time, or a weighted average including the current processed using DSP techniques such as a finite impulse response (FIR) of the current. The average current calculated in block 504 may not be a single average current but may be a series of average currents associated with a plurality of periods of time (e.g., 30 seconds, 60 seconds, 120 seconds, 240 seconds). The average current from 504 is compared with a threshold for the corresponding period of time in block 506. If the average current from 504 is less than the threshold for the corresponding time period, the system continues to measure and calculate the average current. If the average current from 504 is greater than the threshold for the corresponding time period, a signal is generated producing a command in which the contactors (302, 304, 306 and 308) are opened in block 508 and a diagnosis message is output indicating a fault condition in block 510.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

Although exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

Although various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a fraction battery;
   a plurality of components each having a maximum amp■hour rating for each of a plurality of time periods;
   at least one contactor configured to selectively connect the battery and components; and
   at least one controller programmed to open the at least one contactor to interrupt a flow of current between the battery and the components in response to at least one of a plurality of amp■hour measurements for different time periods exceeding a corresponding predetermined threshold, wherein the predetermined threshold is based on an average vehicle load and a minimum of the ratings for the time period associated with the at least one of a plurality of amp■hour measurements.

2. The vehicle of claim 1, wherein the different time periods have different begin times and a same end time.

3. The vehicle of claim 1, wherein the predetermined threshold decreases as a duration of the time periods increases.

4. The vehicle of claim 1, wherein the components include a circuit interrupt device (CID), a high voltage wire, a bus bar, a connector, or a terminal.

5. The vehicle of claim 4, wherein the CID has, for each of the different time periods, a maximum amp■hour rating less than a minimum of the ratings for the time periods having a duration less than a predetermined duration.

6. The vehicle of claim 1, wherein the current is a root mean square current.

7. A method of controlling a high voltage system of a vehicle comprising:
   measuring a battery current;
   calculating amp■hours discharged for a plurality of different time periods based on the battery current, wherein the different time periods have different start times and a same end time;
   comparing each of the amp■hours discharged to a predetermined threshold associated with one of the different time periods; and
   selectively opening at least one contactor to interrupt current flow to the high voltage system based on the comparisons.

8. The method of claim 7, wherein the measuring is performed while the vehicle is operating.

9. The method of claim 7, wherein the measuring is performed while the vehicle is charging.

10. A vehicle comprising:
    a fraction battery;
    an electrical component;
    a contactor configured to selectively connect the battery and component; and
    at least one controller programmed to open the contactor to interrupt current flow to the component in response to any one of a plurality of amp■hour measurements associated with the battery for different time periods exceeding a corresponding predetermined threshold value, wherein the different time periods have different begin times and a same end time.

11. The vehicle of claim 10, wherein the predetermined threshold value decreases as a duration of the time periods increases.

12. The vehicle of claim 10, wherein each of the components has a maximum amp·hour rating for each of the different time periods and wherein the predetermined threshold values are based on an average vehicle load and a minimum of the ratings for each of the different time periods.

13. The vehicle of claim 10, further including a circuit interrupt device (CID) having, for each of the different time periods, a maximum amp·hour rating less than a minimum of the ratings for the time periods having a duration less than a predetermined duration.

\* \* \* \* \*

UNITED STATES PATENT AND TRADEMARK OFFICE
CERTIFICATE OF CORRECTION

PATENT NO. : 9,013,839 B1  
APPLICATION NO. : 14/057773  
DATED : April 21, 2015  
INVENTOR(S) : Kevin Vander Laan et al.

Page 1 of 1

It is certified that error appears in the above-identified patent and that said Letters Patent is hereby corrected as shown below:

In the specification

Column 2, Line 27:

Delete "The fraction battery" and
Insert -- The traction battery --.

In the claims

Column 6, Line 8, Claim 1:

Delete "The fraction battery" and
Insert -- The traction battery --.

Column 6, Line 54, Claim 1:

Delete "The fraction battery" and
Insert -- The traction battery --.

Signed and Sealed this
Ninth Day of August, 2016

Michelle K. Lee
*Director of the United States Patent and Trademark Office*